United States Patent
Anandappan et al.

(10) Patent No.: US 9,473,235 B2
(45) Date of Patent: Oct. 18, 2016

(54) ROUTING BASED ON LENGTH OF TIME OF AVAILABLE CONNECTION

(71) Applicant: Honeywell International Inc., Morristown, NJ (US)

(72) Inventors: Thanga Anandappan, Bangalore (IN); Aloke Roy, Gaithersburg, MD (US); Sharath Babu Malve, Bangalore (IN); Louis T. Toth, Baltimore, MD (US)

(73) Assignee: Honeywell International Inc., Morris Plains, NJ (US)

( * ) Notice: Subject to any disclaimer, the term of this patent is extended or adjusted under 35 U.S.C. 154(b) by 226 days.

(21) Appl. No.: 14/155,968

(22) Filed: Jan. 15, 2014

(65) Prior Publication Data
US 2016/0269274 A1    Sep. 15, 2016

(51) Int. Cl.
H04B 7/185    (2006.01)
H04L 12/733    (2013.01)
H04L 12/721    (2013.01)

(52) U.S. Cl.
CPC .......... *H04B 7/18504* (2013.01); *H04B 7/185* (2013.01); *H04B 7/18502* (2013.01); *H04B 7/18506* (2013.01); *H04L 45/127* (2013.01); *H04L 45/20* (2013.01)

(58) Field of Classification Search
CPC .......... H04W 40/026; H04B 7/18504; H04B 7/18502; H04B 7/185; H04B 7/14; H04L 45/127
See application file for complete search history.

(56) References Cited

U.S. PATENT DOCUMENTS

| 5,530,909 | A | 6/1996 | Simon et al. |
| 5,977,508 | A | 11/1999 | Takano |
| 6,977,608 | B1 | 12/2005 | Anderson et al. |
| 8,270,415 | B2 | 9/2012 | Niranjan et al. |
| 8,509,140 | B2 * | 8/2013 | Kauffman .......... H04B 7/18504 370/310 |
| 8,553,561 | B1 * | 10/2013 | Chokshi et al. ....... G08C 15/00 370/238 |
| 9,049,740 | B1 * | 6/2015 | Tillotson ............... H04W 88/04 |
| 2009/0103452 | A1 | 4/2009 | Horvath |
| 2009/0103473 | A1 | 4/2009 | Foster et al. |
| 2009/0221285 | A1 * | 9/2009 | Dobosz .............. H04B 7/18504 455/431 |
| 2011/0057830 | A1 * | 3/2011 | Sampigethaya et al. ..................... G01S 5/0072 342/36 |

(Continued)

OTHER PUBLICATIONS

Barhydt et al., "Newly Enacted Intent Changes to ADS-B MASPS: Emphasis on Operations, Compatibility, and Integrity", Aug. 5-8, 2002, pp. 1-8, Publisher: American Institute of Aeronautics and Astronautics, Published in: US.

(Continued)

*Primary Examiner* — Omer S Mian
(74) *Attorney, Agent, or Firm* — Fogg & Powers LLC (57) ABSTRACT

In an embodiment, a method of routing packets at a first node in an ad-hoc network is provided. The method includes receiving, at the first node, a plurality of route-alive messages corresponding to a destination, each of the plurality of route-alive messages including a route time indicating a length of time in which a communicative connection is available between the second node that sent the respective route-alive message and the destination. The method also includes determining an updated route time for each second node. The updated route time corresponds to a length of time in which a communication connection is available between the first node and the destination through the respective second node. A second node is selected for sending a packet to based on the updated route time for each of the second nodes, wherein a node having a longer updated route time is given higher priority for selection.

13 Claims, 5 Drawing Sheets

(56) References Cited

U.S. PATENT DOCUMENTS

2013/0029593 A1* 1/2013 Calmettes .......... H04B 7/18504
455/12.1
2013/0070677 A1* 3/2013 Chang ................ G01S 13/9303
370/328

OTHER PUBLICATIONS

Hyeon et al., "A New Geographic Routing Protocol for Aircraft AD HOC Networks", "29th Digital Avionics Systems Conference", Oct. 3-7, 2010, pp. 1-8, Publisher: IEEE, Published in: KR.

* cited by examiner

ROUTING BASED ON LENGTH OF TIME OF AVAILABLE CONNECTION

GOVERNMENT LICENSE RIGHTS

The U.S. Government may have certain rights in the present invention as provided for by the terms of Government Contract # NNA12AB80C awarded by NASA Ames Research Center.

BACKGROUND

Link layers are typically designed only to forward packets to a directly connected entity. Sending a packet to an entity connected through one or more other nodes uses a routing protocol, which is a higher layer protocol than the link layer. Traditional routing protocols are designed for networks that are generally stable in nature. As such, the routing configurations do not change unless a new network reconfiguration is added or an existing network is deleted. Accordingly, in such static networks, the routing protocol does not need to implement routing updates very often.

These traditional routing protocols also have algorithms implemented to arrive at the entire network topology. Routers in the network exchange big data structures containing routing information of all known destination nodes. The routers may aggregate the routes of a group of destinations to arrive at a single route instead of having multiple routing entries. Also, in the current framework of the internet, routing is done based on the number of next hops and their reachability information based on the information received from peer routers.

SUMMARY

In an embodiment, a method of routing packets at a first node in an ad-hoc network is provided. The method includes receiving, at the first node, a plurality of route-alive messages corresponding to the same destination, each of the plurality of route-alive messages sent by a different node of a plurality of second nodes, and each of the plurality of route-alive messages including a route time indicating a length of time in which a communicative connection is available between the node of the plurality of second nodes that sent the respective route-alive message and the destination. Providing a packet to be routed to the destination, the method also includes determining an updated route time for each of plurality of second nodes based on the route time indicated in each route-alive message. The updated route time corresponds to a length of time in which a communication connection is available between the first node and the destination through the respective second node. A node of the plurality of second nodes is selected based on the updated route time for each of the plurality of second nodes, wherein a node having a longer updated route time is given higher priority for selection. The packet is sent from the first node to the selected node.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The present disclosure is directed to a light weight routing protocol that is proposed to address the needs of an ad-hoc network including highly mobile nodes, such as in an air-to-air network of aircraft. Since aircraft may move at fast speeds and in different directions, the connectively between respective aircrafts can change often. Thus, the overall network topology is much more dynamic with more frequent changes at the link level than that assumed by traditional routing protocols. In the routing protocol described herein, each aircraft within the ad-hoc network has its own autonomous domain comprising network elements such as routers and end systems configured within that network domain. In many traditional routing protocols, the aircraft would need to keep track of network topology and update the network topology every time the network changes, which can be on the order of minutes or hours. Such a traditional routing protocol would lead to route flooding in an environment such as air-to-air networking of aircraft. This route flooding would not only occupy the bandwidth of air-to-air links, but may take quite long duration for route convergence. Such route convergence may never even happen and the network may lose stability.

Additionally, aggregation of routing information in a traditional routing protocol may have issues with a frequently changing network. Such aggregation may fail after sometime if nodes (e.g., aircraft) depart in different directions. Moreover, often a given aircraft only needs routes to a small number of the available nodes. As such it is not required for the aircraft to maintain a routing table including routes to all aircraft in the sky. Often an aircraft may only need to route to a single (e.g., the nearest) air traffic control (ATC) tower at a time. Achieving such limited routing functionality with traditional routing protocols would be too cumbersome.

The routing protocol described herein forms an ad-hoc network for routing packets between highly mobile nodes (e.g., aircraft). This routing protocol can be used for routing packets between an aircraft and a ground station. This routing protocol is a light weight protocol that determines the next hop for a packet without the need to generate a routing table including the entire route from a source node to a destination node. This routing protocol determines the next hop based on a length of time in which a communicative connection is available between the node at which the packet is currently located and the destination. This routing protocol can also factor in the location of other nodes when selecting the node in which to send the packet. This routing protocol can be used with any suitable air-to-air link technology, including any air-to-air link technology developed in the future.

Figure 1:
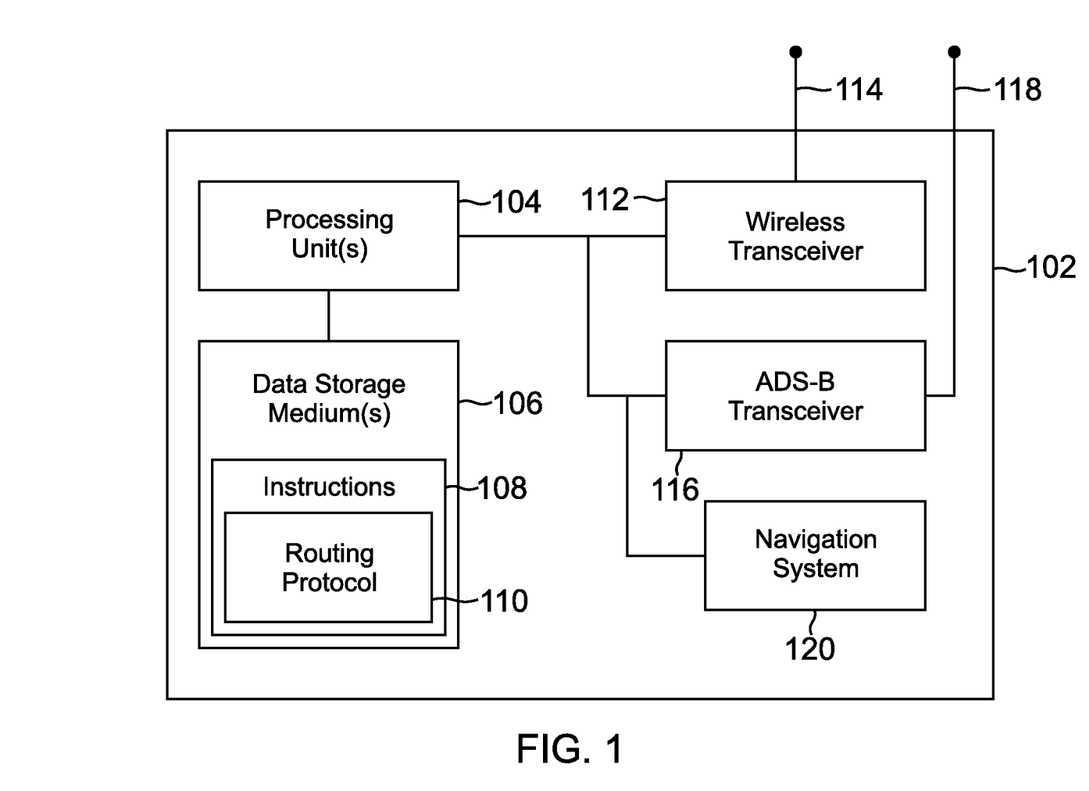
FIG. 1 is a block diagram of an example node for which the light weight routing protocol described herein can be used.

FIG. 1 is a block diagram of an example node 102 for which this routing protocol can be used. The node 102 is configured to wirelessly communicate with other nodes 102. In an example, the node 102 is mobile, in that the node 102 is configured to physically move or be moved with respect to the other nodes 102. The node 102 can comprise or be included in an aircraft (airplane, jet, spacecraft, blimp, etc.), ground-vehicle (car, truck, semi, tractor, military vehicle, etc.), water-vehicle (boat, ship, submarine, etc.), person, electronic device (e.g., mobile phone, tablet, laptop, etc.), or mobile robot. In the example shown in FIG. 1, the node 102 is an aircraft.

The node 102 includes one or more processing units 104 coupled to one or more data storage mediums 106. The one or more processing units are configured to execute instructions 108 stored (or otherwise embodied) on the one or more data storage mediums 106. The one or more processing units 104 can include a general purpose processor, such as a central processing unit (CPU), or a special purpose processor. The one or more data storage mediums 106 can include any suitable type of non-volatile technology such as flash memory, an optical disk, or a magnetic disk drive. The node 102 can also include a volatile memory that is coupled to the one or more data storage mediums 106 and the one or more processing units 104 for storing instructions 108 (and related data) during execution by the one or more processing units 104. Memory comprises, in one implementation, any suitable form of random access memory (RAM) now known or later developed, such as dynamic random access memory (DRAM). In other implementations other types of memory are used. The instructions 108 include a routing protocol 110 for routing packets in an ad-hoc network including highly mobile nodes 102 as described herein. The routing protocol 110, when executed by the one or more processing units 104, causes the one or more processing units to implement the functionality of the routing protocol, and more generally node 102, described herein.

The node 102 also includes a wireless transceiver 112 coupled to the one or more processing units 104. The wireless transceiver 112 is coupled to an antenna unit 114 and is configure to transmit and receive wireless signals through the antenna unit 114. In particular, the wireless transceiver 112 is configured to transmit and receive wireless signals to and from other nodes 102 of an ad-hoc network. The one or more processing units 104 are configured to send packets to the wireless transceiver 112 for transmitting to another node 102 and to receive packets from the wireless transceiver 112 that are transmitted from other nodes 102.

In some examples, the node 102 also includes an automatic dependent surveillance broadcast (ADS-B) transceiver 116 coupled to the one or more processing units 104. The ADS-B transceiver 116 operates in the same manner as a conventional ADS-B transceiver 116, which is commonly included in an aircraft. The ADS-B transceiver 116 broadcasts an ADS-B signal including location and intended future movement (intent) information for the node 102. The ADS-B transceiver 116 also receives ADS-B (wireless) signals from other nodes 102 within range. From the ADS-B signals from other nodes 102, the ADS-B transceiver 116 obtains the location and intent information for such other nodes 102. This location and intent information can be provided to the one or more processing units 104 to be used to execute the routing protocol 110. The ADS-B transceiver 116 is coupled to an antenna unit 118. Although FIG. 1 illustrates the ADS-B transceiver 116 and the antenna unit 118 as separate from the wireless transceiver 112 and antenna unit 114, the ADS-B transceiver 116 and the wireless transceiver 112 can be implemented in a single transceiver or in separate transceivers as shown. Similarly, the antenna unit 114 and the antenna unit 118 can be implemented as a single antenna unit or as separate antenna units as shown. Although this example is described with respect to an ADS-B transceiver, future aircraft surveillance technologies can also be used.

The node 102 can also include a navigation system 120 coupled to the one or more processing units 104 and configured to determine a location (e.g., latitude, longitude, and attitude) of the node 102. Any suitable navigation system 120 can be used including a simple global navigation satellite system receiver (e.g., a Global Positioning System (GPS) receiver) or a more complex strap-down navigation system.

Figure 2:
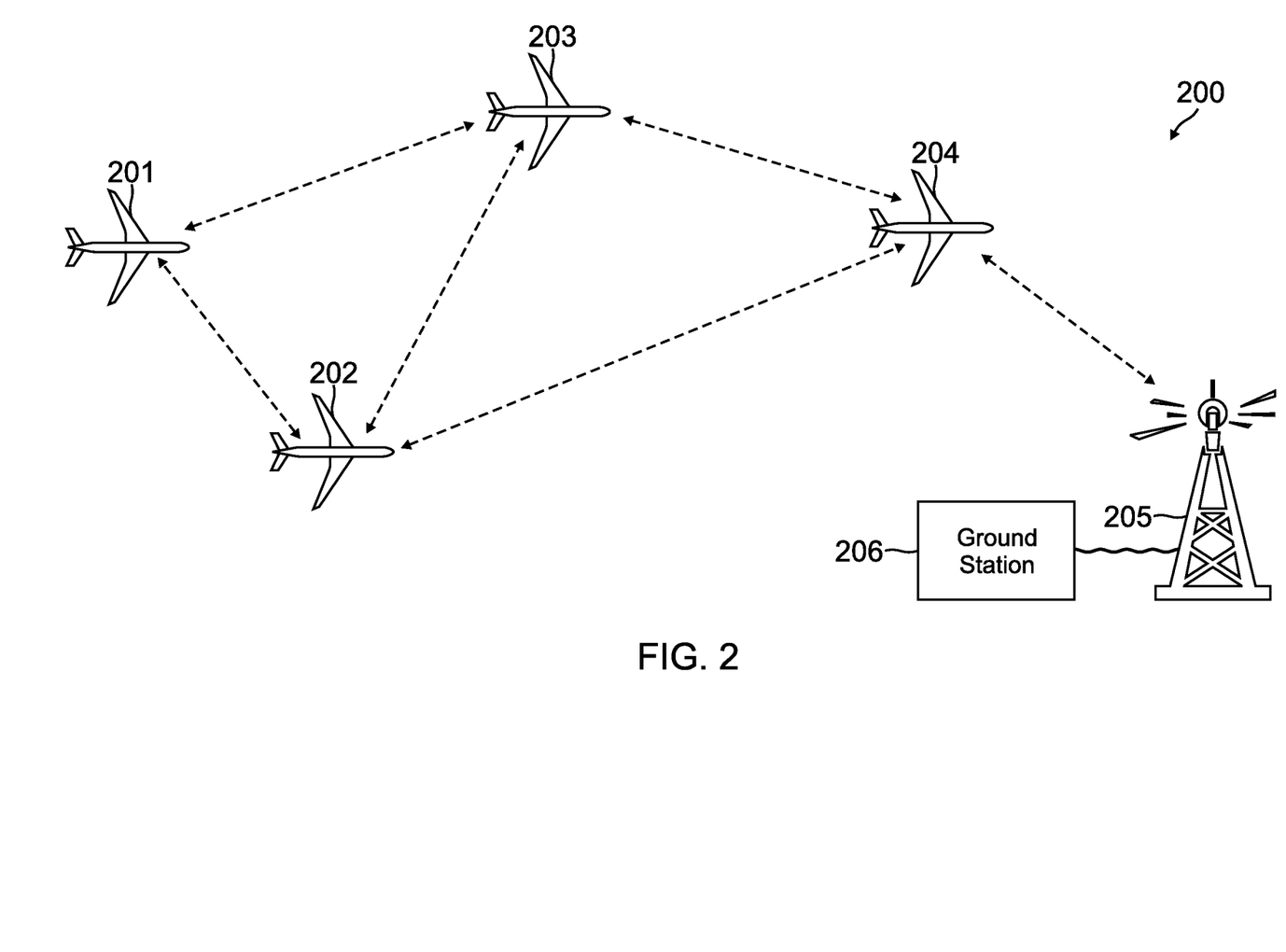
FIG. 2 is a diagram of a first state of an example ad-hoc network in which the light weight routing protocol, wherein the network includes examples of nodes from FIG. 1 as aircraft and a tower.

FIG. 2 is a diagram of an example ad-hoc network 200 in which the light weight routing protocol described herein can be used. The network 200 includes a plurality of nodes 102, which are illustrated as aircraft 201, 202, 203, 204 and a ground-based tower 205. In this example, each aircraft 201, 202, 203, 204 is flying through the air and implements the light weight routing protocol described herein utilizing respective wireless air-to-air communication links with other aircraft 201, 202, 203, 204 and, in some cases, a wireless air-to-ground communication link with the tower 205. Such wireless communication links are implemented by the wireless transceivers 112 of each respective node 102 (aircraft 201, 202, 203, 204 and tower 205).

Each aircraft 201, 202, 203, 204 and tower 205 has a limited physical communication range in which direct wireless communication links with another aircraft 201, 202, 203, 204 and tower 205 can be made. As such, each aircraft 201, 202, 203, 204 and tower 205 may not be able to establish a direct communication link with each other aircraft 201, 202, 203, 204 and tower 205. The light weight routing protocol described herein can be used to enable a given aircraft 201, 202, 203, 204 or tower 205 to send and receive packets with another aircraft 201, 202, 203, 204 or tower 205 with which a direct communication link is not possible by routing the packets through other aircraft 201, 202, 203, 204 and tower 205. In the example state (e.g., aircraft and tower locations) shown in FIG. 2, a direct communication link is established between the aircraft 201, and the aircraft 202 and 203. A direct communication link is also established between the aircraft 204, and the aircraft 203 and 204. A direct communication link is also established between the aircraft 202 and the aircraft 203. A direct communication link is also established between the aircraft 204 and the tower 205. No other direct communication links are possible in the example state shown in FIG. 2.

Figure 3:
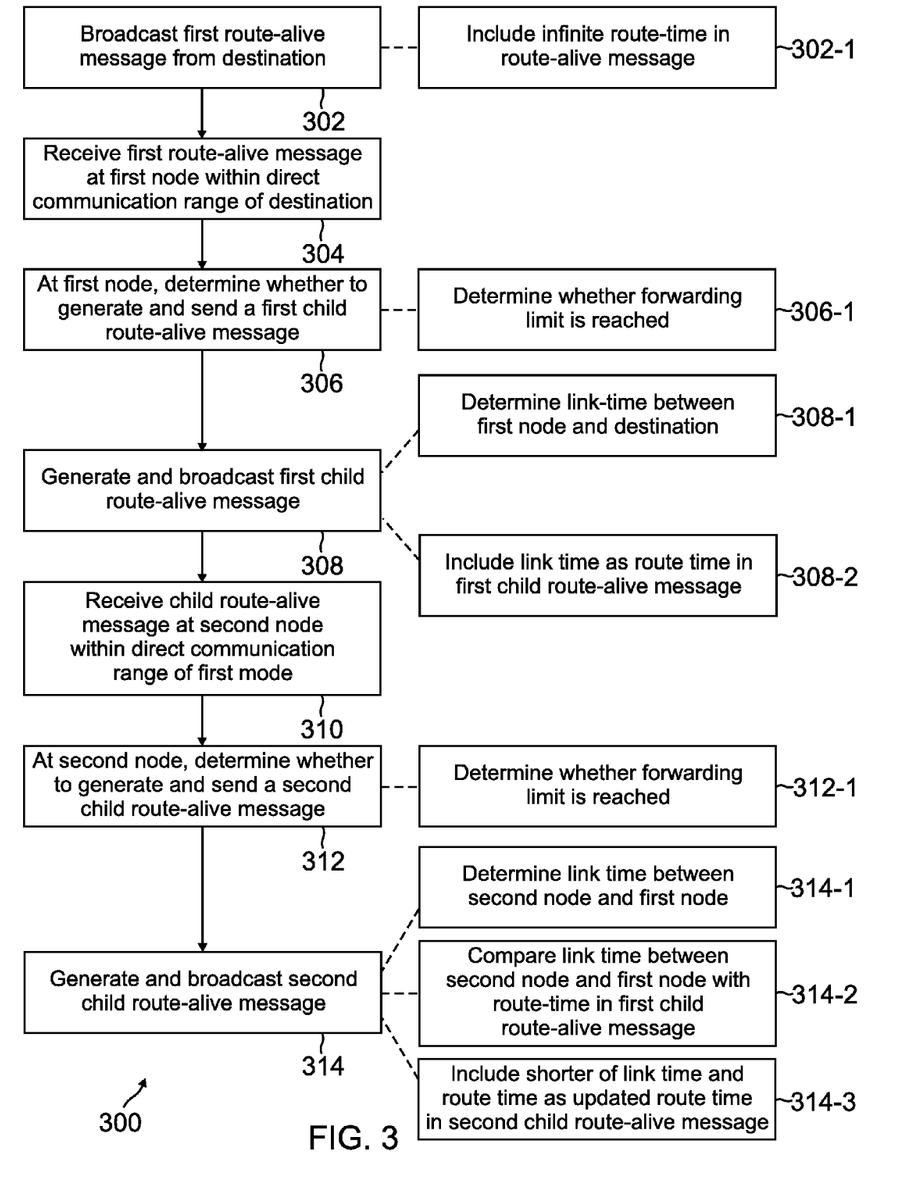
FIG. 3 is a flow diagram of an example method of propagating route-alive messages according to the light weight routing protocol.
Figure 5:
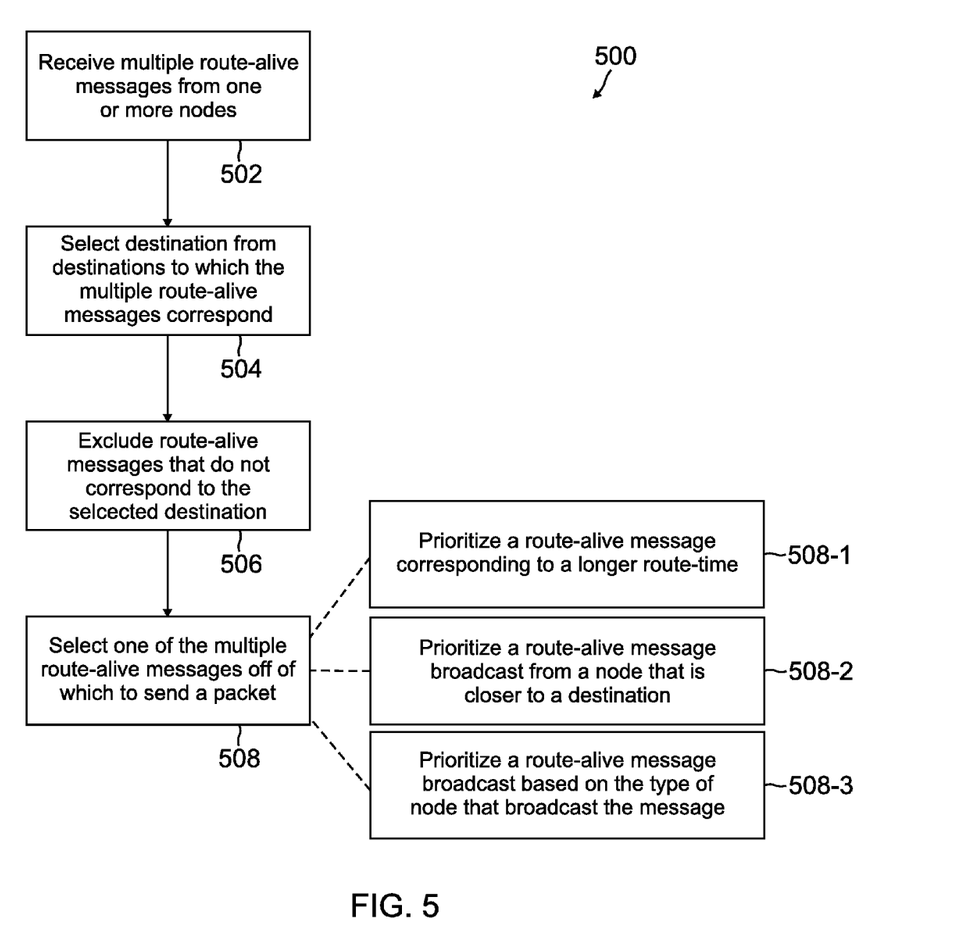
FIG. 5 is a flow diagram of an example method for routing a packet through a network according to the light-weight routing protocol.

FIGS. 3 and 5 are respective flow diagrams of example methods 300 and 500 for implementing aspects of the light weight routing protocol described herein. For descriptive purposes, methods 300 and 500 are described herein with respect to the ad-hoc network 200. As an introduction, a source, as used herein, is the node 102 within the network that initially acts on the packet. In an example, the source is the node 102 that originates the packet. In another example, the source is the first node 102 that receives the packet within the network 200, for example, from an entity in another network to which the node 102 is also coupled. A destination, as used herein, is a node 102 that is the final destination of the packet within the network 200. That is, once the packet reaches the destination, the packet is not routed further within the network 200. The packet may be routed to/within other networks by the destination or may be processed by the destination to obtain the information contained with the packet.

The light weight routing protocol described herein implements route-alive messages to identify communicative connections to a destination. A route-alive message is a message that is broadcast by the nodes 102 (aircraft 201, 202, 203, 204 and tower 205) in the ad-hoc network 200. A route-alive message originates from a possible destination in the network 200 and child route-alive messages are "forwarded" by other nodes in the network 200 to enable nodes 102 outside of the range of the possible destination to identify a communicative connection to the possible destination. In some examples any node 102 in the network 200 can be a possible destination, and can therefore originate its own route-alive message. In other examples, only pre-selected nodes 102 can be a possible destination. For example, possible destinations can be limited (pre-selected) based on a characteristic of the node 102, such as the type of access a node 102 has to another network. In the example shown in FIG. 2, the possible destinations are limited to ground-based towers (e.g., tower 205) that are associated with an aircraft service provider (e.g., air traffic control and aircraft operational control). In other examples, however, both tower 205 and aircraft 201, 202, 203, 204 can be possible destinations.

FIG. 3 is a flow diagram of an example method 300 for propagating route-alive messages. An initial route-alive message is broadcast by a possible destination (block 302). Such a route-alive message includes information identifying the particular destination corresponding to the route-alive message as well as information identifying the node 102 that broadcast the route-alive message. In the example explained with respect to FIG. 3, the relevant destination is the tower 205. For a node 102 that originates a route-alive message (i.e., a destination), the destination corresponding to, and the broadcaster of, the route-alive message is the same node 102. For example, the tower 205, as a possible destination, can generate a first route-alive message that includes information identifying the tower 205 as the destination corresponding to the first route-alive message and as the node 102 that broadcast the first route-alive message. Additional information, such as a route time, can also be included in the route-alive message as discussed below and with respect to block 302-1.

Any other node 102 within direct communication range of the destination broadcasting the route-alive message can receive the route-alive message (block 304). Based on the reception of a route-alive message, such another node 102 can determine that a communicative connection is available with the destination identified in (corresponding to) the route-alive message. For example, aircraft 204 is in direct communication range with the tower 205. Accordingly, the first route-alive message broadcast by the tower 205 can be received by the aircraft 204. Aircraft 204 receives the first route-alive message and determines that the tower 205 is the destination identified in the first route-alive message based on information in the first route-alive message. The aircraft 204 then determines that a communicative connection is available with the tower 205.

Based on the determination that a communicative connection is available with a destination, a node 102 can send a packet to that destination by sending a packet to the node 102 that broadcast the route-alive message. When a node 102 receives a route-alive message directly from a possible destination, as aircraft 204 does with the first route-alive message from tower 205, the act of sending the packet to the tower 205 which broadcast the route-alive message is not very interesting. The larger benefit of the route-alive message comes when nodes 102 broadcast child route-alive messages based off of a route-alive message from a destination.

Along these lines, a node 102 that receives a route-alive message from another node 102 can determine whether to generate a child route-alive message (block 306), and depending on the determination, generate and broadcast the child route-alive message (block 308). A child-route alive message is a route-alive message that is broadcast by a node 102 that is not the destination identified in (corresponding to) the route-alive message. In particular, a child route-alive message is a route-alive message generated by a node 102 that previously received a first route-alive message, and the child route-alive message is a second route-alive message intended to extend the range of the first route-alive message. Thus, the child route-alive message is based off of the (first) received route-alive message. Similar to the route-alive message sent by a destination as described above, a child route-alive message includes information identifying the destination corresponding to the child route-alive message and includes information identifying the node 102 that broadcast the child route-alive message. In particular, the child route-alive message identifies as the destination, the destination identified in the first route-alive message received. That is, the destination corresponding to the child route-alive message is the same as the destination to which first (received) route-alive message corresponds. The fact that a first node 102 can receive a route-alive message indicates that a communicative connection between that first node 102 and the destination identified in the route-alive message is present. Accordingly, the first node 102 can broadcast a (child) route-alive message corresponding to the destination in the received route-alive message since a route is available through the first node 102 to that destination. The first node 102 also includes information in the child route-alive message that identifies first node 102 as the node that broadcast the child route-alive message.

In an example a forwarding limit is implemented to limit the generation of child route-alive messages. In such an example, the first node 102 determines whether a child route-alive message is to be generated (and broadcast) as controlled by the forwarding limit (block 306-1), prior to generating and broadcasting the child route-alive message. A forwarding limit can be implemented to restrict the propagation of route-alive messages corresponding to a particular destination, for example, so that the route-alive messages do not propagate uncontrollably throughout a network.

In an example, the forwarding limit is a number of hops from the destination. In such an example, the first node 102 determines how many hops the received route-alive message corresponds to and compares the number of hops to the forwarding limit. If the forwarding limit is 3 hops and the route-alive message corresponds to 3 hops from the destination (e.g., the tower 205), the first node 102 does not generate and broadcast the child route-alive message. If the forwarding limit is 3 hops and the received route-alive message corresponds to 2 or fewer hops from the destination, the first node 102 proceeds with generating and broadcasting the child-route alive message. In such an example, each route-alive message includes a hop number which is incremented each time a child route-alive message is generated. The destination can initially include a hop number set to zero. A node 102 that receives this route-alive message indicating zero hops generates a child route-alive message including a hop number set to one. A node 102 that receives this child route-alive message indicating one hop generates another child route-alive message including a hop number set to two. This process occurs until the forwarding limit is reached. Notably, a forwarding limit based on number of hops is specific to the node 102 from which a route-alive message is received. That is, if a first node 102 receives a first route-alive message from a second node 102 indicating a number of hops equal to 3 and a second route-alive message from a third node 102 indicating a number of hops equal to 2, and the forwarding limit is 3 hops, the first node 102 will generate and broadcast a child route-alive message based off the route-alive message from the third node 102, but will not generate and broadcast a child route-alive message based off the route-alive message from the second node 102.

In another example, the forwarding limit is a physical distance from the destination. In such an example, the first node 102 determines a physical distance between the first node 102 and the destination and compares the physical distance to the forwarding limit. If the forwarding limit is 150 nautical miles and the physical distance between the first node 102 and the destination (e.g., the tower 205) is more than 150 nautical miles, the first node 102 does not generate and broadcast the child route-alive message. If the forwarding limit is 150 nautical miles and the physical distance between the first node 102 and the destination is less than 150 nautical miles, the first node 102 proceeds with generating and broadcasting the child route-alive message. In such an example, each route-alive message includes information indicating a location of the destination (e.g., latitude, longitude, and, in some examples, altitude). The location of the destination can be included in the initial route-alive message generated by the destination and then copied by each node 102 generating a child route-alive message. The physical distance between a node 102 receiving a route-alive message and the destination can be determined in any suitable manner, including in the manners described below.

Referring back to FIG. 2, if aircraft 204 determines that the forwarding limit has not been reached, then aircraft 204 generates and broadcasts a child route-alive message based off of the route-alive message received from the tower 205 (block 308). Accordingly, the aircraft 204 generates and broadcasts a (child) route-alive message identifying the tower 205 as the destination and including information identifying the aircraft 204 as the node 102 that broadcast the child route-alive message. Additional information, such as a route time, can also be included in such a child route-alive message as described below and with respect to blocks 308-1 and 308-2.

Each node 102 receiving a given route-alive message (whether that given route-alive message is a child route-alive message or a route-alive message received directly from a destination) implements the procedure described above with respect to block 306, 306-1, and 308 to potentially generate and broadcast a child route-alive message based off of that given route-alive message. In this way, route-alive messages corresponding to a particular destination are propagated through the network 200 and can be used to identify communicative connections to a destination by a node 102 that is not within direct communication range of that destination.

In the example shown in FIG. 2, since both aircraft 202 and aircraft 203 are within direct communication range of the aircraft 204, both aircraft 202 and aircraft 203 receive the child route-alive message broadcast by aircraft 204 (block 310). Based on the reception of this child route-alive message, the aircraft 202 and aircraft 203 can determine that a communicative connection is available with the tower 205 which is identified as the destination in the child route-alive message from the aircraft 204. This child route-alive message also identifies that it was broadcast by the aircraft 204. From this information, the aircraft 202 and aircraft 203 determine that in order to send a packet to the tower 205, the aircraft 202 and aircraft 203 send the packet to the aircraft 204, which can forward the packet to the tower 205. In this way, a communicative connection to the tower 205 can be identified for aircraft 202 and aircraft 203 through the aircraft 204 via the route-alive messages.

In addition to identifying that a communicative connection to the tower 205 is available based on reception of the child route-alive message from the aircraft 204, each of aircraft 202 and 203 can also determine whether to generate and broadcast their own child route-alive message (block 312) based on the receive (child) route-alive message from the aircraft 204. In particular, each of aircraft 202 and 203 can determine if the forwarding limit has been reached (block 312-1), and if it has not, generate and send their own child route-alive message (block 314) based off the child route-alive message received from the aircraft 204. Such child route-alive messages generated by the aircraft 202 and aircraft 203 respectively, are generated in the same manner as the child route-alive message described with respect to aircraft 204, except each of these child route-alive messages (generated by the aircraft 202 and aircraft 203 respectively) are generated based off of the child route-alive message received from aircraft 204. Accordingly, each such child route-alive message includes information indicating the tower 205 as the destination and includes information indicating that the aircraft 202 or aircraft 203, respectively, broadcast the child route-alive message. The child route-alive messages can also include information relating to a forwarding limit as discussed above.

Figure 4:
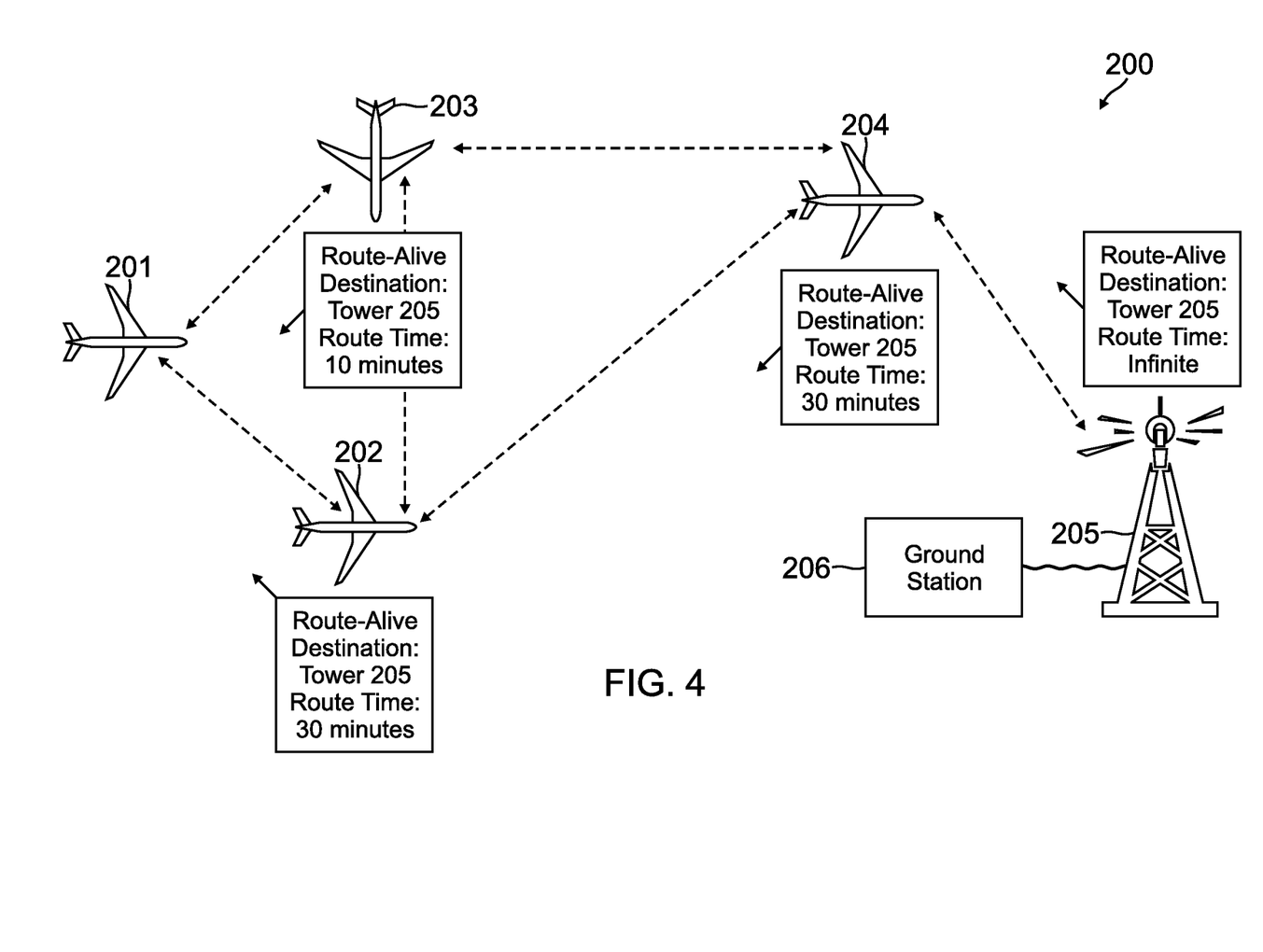
FIG. 4 is a diagram of a second state of the ad-hoc network of FIG. 2.

Referring now to FIG. 4, another example state involving the aircraft 201, 202, 203, 204, and tower 205 is shown. In this example state (e.g., aircraft and tower locations and directions of travel), a direct communication link is established between the aircraft 201, and the aircraft 202 and 203. A direct communication link is also established between the aircraft 204, and the aircraft 203 and 204. A direct communication link is also established between the aircraft 202 and the aircraft 203. A direct communication link is also established between the aircraft 204 and the tower 205. No other direct communication links are possible in the example state shown in FIG. 4. Additionally, as shown, aircraft 201, 202, and 204 are moving in approximately the same direction, while aircraft 203 is moving across the paths of aircraft 201, 202, and 204.

Since the aircraft 201 is within direct communication range of both the aircraft 202 and the aircraft 203, the aircraft 201 can receive both the route-alive message broadcast by aircraft 202 and the route-alive message broadcast by aircraft 203. Since both route-alive messages correspond to the same destination (tower 205), the aircraft 201 has two potential routes over which a packet can be sent to the tower 205.

In an example, a node 102 having multiple potential routes to a destination, selects which route to send a packet over based, in part, on a length of time in which each route is available (described in more detail below with respect to FIG. 5). The length of time in which a route is available is equal to the length of time in which the link between each node 102 in the route is available. If one of the links is not available, the route as a whole is not available. Thus, the length of time in which a route is available is equal to the length of time of availability of the link on the route having the shortest available time. The length of time in which a route is available is referred to herein as the "route time" for the route. The length of time in which a link (i.e. a direct (no hop) communicative connection) is available between two nodes 102 is referred to herein as the "link time".

The link on a route having the shortest link time and, equivalently, the route time for the route can be determined by including information in each route-alive message indicating the route time for the route if the route started from the node 102 that broadcast the respective route-alive message. For example, if the link between the aircraft 204 and the tower 205 has a link time of 30 minutes (block 308-1), the aircraft 204 would include a route time with the child route-alive message (based off the route-alive message from the tower 205 as destination), where the route time indicates 30 minutes of availability for the route (block 308-2).

In an example, a first node 102 receiving a route-alive message from a second node 102, determines the route time to include in a child route-alive message broadcast thereby by selecting, as the route time, the shorter of the route time indicated in the received route-alive message off which the child route-alive message is based, and the link time for the link between the first node 102 and the second node 102. This selected route time is included in the child route-alive message broadcast by the first node 102. Notably, if the link time between the first node 102 and the second node 102 is longer than the route time indicated in the received route-alive message, the route time in the child route-alive message is the same as the route time in the received route-alive message.

In such an example, a destination broadcasting a route-alive message corresponding to itself as the destination can include an infinite route time (block 302-1). As long as the forwarding limit has not been reached, a node 102 that receives the route-alive message determines an updated route time to take into account the link between the node 102 and the destination, generates a child route-alive message as discussed above, and includes the updated route time with the child route-alive message. This process continues at each node 102 such that, as long as the forwarding limit has not been reached, a node 102 receiving the child route-alive message again determines an updated route time and generates a new child route-alive message including the updated route time. In this way, a node 102 that receives a route-alive message can determine the route-time for the route corresponding to that route-alive message based on the route time indicated in the route-alive message.

Regardless of whether a node 102 is broadcasting a child route-alive message, if a node 102 is deciding between two potential route-alive messages as described below with respect to FIG. 5, the node 102 can determine a respective route time, in the manner described above, from the node 102 to the destination for each of the route-alive messages received. That is, the node 102 can determine a respective route time for each route-alive message received by selecting, as the respective route time, the shorter of the route time indicated in the respective route-alive message and the link time for the link between the node 102 and the node 102 from which the respective route-alive message was received. The node 102 can then use these route times to select which node 102 to send a packet to (i.e., which route to send a packet on) in order to get that packet to the destination. Referring back to FIG. 4, if the aircraft 203 receives a route-alive message from the aircraft 204 indicating a route time of 30 minutes and the aircraft 203 determines a link time between itself and aircraft 204 of 10 minutes (block 314-1), aircraft 203 compares the link time with the route time (block 314-2) and selects 10 minutes as the route time to the tower 205 via the aircraft 204 (block 314-3).

Since many of the nodes 102 in the ad-hoc network 200 are mobile, in an example, a first node 102 can calculate a link time between the first node 102 and a second node 102 based on the location and expected future movement of each of the first and second nodes 102. In an example, the location (e.g., latitude, longitude, and altitude) and expected future movement for the first node 102 can be provided by the second node 102 to the first node 102. The first node 102 and the second node 102 can obtain their respective location and expected future movement from, for example, a respective navigation system 120 onboard the first and second node 102. Once the first node 102 obtains the location and expected future movement of the first node 102 and the second node 102, the first node 102 can determine the link time by calculating the length of time in which the physical distance between first node 102 and the second node 102 is at or below a threshold distance. The threshold distance can be selected based on a wireless communication range for the nodes 102. Accordingly, the link time can incorporate the relative locations and movement of the nodes 102.

Referring back to FIG. 4, in examples where some or all of the nodes 102 are aircraft 201, 202, 203, 204 that are flying in the air, the location and expected movement of each aircraft 201, 202, 203, 204 can be obtained from the automatic dependent surveillance broadcast (ADS-B) signal broadcast by each aircraft 201, 202, 203, 204. As known, the ADS-B signal broadcast by an aircraft 201, 202, 203, 204 includes the current location and intent (expected future movement) information for the aircraft 201, 202, 203, 204. Since the ADS-B signals are received by other aircraft 201, 202, 203, 204 that are within range, the location and future movement of such other aircraft 201, 202, 203, 204 can be determined. For nodes 102 that are stationary, the location can be sent by the stationary node 102 or the location can be looked-up in a table that is stored in the one or more data storage mediums 106 of a node 102. In some examples, a stationary node 102 sends an indication that it is stationary, such that other nodes 102 can be aware that it is a stationary node 102. With reference to FIG. 4, the tower 205, as a stationary node 102, can, for example, broadcast its location, or in another example, each aircraft 201, 202, 203, 204 can have a table stored on respective data storage medium(s) that includes each tower and its location. In such an example, the aircraft 201, 202, 203, 204 could identify the tower and look-up its location in the table.

In any case, once the location and expected future movement of a given aircraft 201, 202, 203, 204 or the location of a tower 205 is known by another aircraft, 201, 202, 203, 204, the link time between respective aircraft 201, 202, 203, 204 and/or the tower 205 can be determined using known math techniques.

Although FIG. 3 has been described with respect to a single destination, it should be understood that, in other examples, multiple destinations can be present, with each such destination broadcasting its own respective route-alive message. Distinct child route-alive messages can then be generated and broadcast as described above for each destination if a route-alive message corresponding to that destination is received at a given node. Accordingly, a given node may generate and broadcast multiple child route-alive messages, each child route-alive message corresponding to a different destination.

Additionally, a given destination can periodically broadcast a route-alive message. Each time a route-alive message is received at a given node, that node can generate and broadcast a child route-alive message as described above. Accordingly, the method described above with respect to FIG. 3 can occur periodically based on the broadcast of the route-alive message from the destination.

Referring now to FIG. 5, a flow diagram of an example method 500 for routing a packet through a network according to the light-weight routing protocol is shown. As is evident from the above, a first node 102 may receive multiple route-alive messages (block 502). Some of these route-alive messages can correspond to the same destination and/or some of these route-alive messages can correspond to different destinations. Each of the multiple route-alive messages is received from another node 102 within the network 200. To send a packet to one of the destinations corresponding to the multiple route-alive messages, the first node 102 selects one of the multiple route-alive messages off of which to send the packet. The selected route-alive message corresponds to a particular next hop node 102 and a particular destination. Thus, selecting a route-alive message, selects a next hop node 102 and a particular destination for the packet. Selecting a particular route-alive message definitively selects the next hop node 102 for the packet. That is, the packet is sent to the node 102 that broadcast the selected route-alive message. Notably, since the first node 102 can only receive route-alive messages from next hop nodes 102 that are within direct communication range of the first node 102, the selection is limited to nodes 102 that are within direct communication range of the first node 102.

In situations where the first node 102 receives multiple route-alive messages corresponding to multiple destinations, the first node 102 can determine which of the destinations to send a packet to in any suitable manner. The destination can be selected from among destinations to which communicative connection from the node 102 is currently available. That is, the destination is selected from the set of destinations to which the plurality of received route-alive messages correspond. In an example, there is no communicative connection to destinations for which corresponding route-alive messages are not received, thus, such destinations cannot be selected.

In an example, the destination can be selected prior to factoring in other factors for selecting a route-alive message off of which to send a packet (block 504). In an example, the destination can be selected based on the payload information of the packet, for example, where the payload information is directed. Other factors can also be used to select the destination. In such an example, route-alive messages that do not correspond to the selected destination can be excluded from selection (block 506).

Referring to FIG. 2, in an example, the destination of a packet that is currently located at the aircraft 201 is the tower 205. Accordingly, the packet is to be routed through the network 200 to the tower 205. The packet, for example, can contain datalink information generated by the aircraft 201. Datalink information is information to be sent over a datalink to a ground station 206. The tower 205 can be communicatively coupled to such a ground station 206 such that the tower 205 can send the packet to the ground station 206 once the packet is received at the tower 205. In an example, the tower 205 can be associated with (e.g., located by and/or under the control of) the ground station 206. In such an example, the aircraft 201 can select the tower 205 as the destination based on the fact that payload for the packet is directed to the ground station 206, the tower 205 is associated with the ground station 206, and a communicative connection between the tower 205 and the aircraft 201 is present.

In such an example where the destination is selected prior to factoring in other factors, once the destination is selected and any route-alive messages not corresponding to the destination are excluded from selection, if more than one route-alive messages remains, a route-alive message from the more than one route-alive message can be selected based on one or more factors (block 508) as discussed below. If only one route-alive message remains, that route-alive message is selected.

In other examples, the destination can simply be one of multiple factors used to select a route-alive message from the multiple route-alive messages as is discussed below with respect to block 508. That is, the node 102 can select which of multiple route-alive messages to send a packet based off by factoring in the destination along with the route time and/or other factors listed herein. In such examples, block 504 and 506 would not be performed and the destination would be factored in at block 508, which is discussed below. Such a destination factor for the route-alive messages can be prioritized in any suitable manner such as by giving higher priority to a route-alive message corresponding to a destination having a route with fewer hops, to a route-alive message corresponding to a destination having a route with a longer route-time, to a route-alive message corresponding to a destination that is physically closer than another, to a route-alive message corresponding to a destination of a certain type, to a route-alive message corresponding to a destination associated with a certain entity, and/or other factors. In some examples where a node 102 receives a packet from another entity in another network or from another node 102, the packet 102 can identify the destination in overhead information contained within the packet.

In any case, the first node 102 can select one of multiple route-alive messages off of which to send a packet based on one or more factors (block 508). For example, the appropriate information and/or priorities for each of the one or more factors are determined, and the node 102 selects the best route-alive message based on a combination of the priorities/information for each of the factors. Such a combination of the factors can be implemented in any suitable manner.

In an example, a first factor is route time (block 508-1). In such an example, a node 102 selects which of multiple route-alive messages to send a packet based by giving a higher priority to route-alive messages corresponding to routes having a longer route time. As described above with respect to FIG. 3, the node 102 can determine a respective route time for a route-alive message received by selecting, as the route time, the shorter of the route time indicated in the route-alive message received and the link time for the link between the node 102 and the node 102 from which the route-alive message was received.

Referring to FIG. 4, if aircraft 201 receives a route-alive message from aircraft 202 corresponding to the tower 205 as a destination and also receives a route-alive message from aircraft 203 corresponding to the tower 204 as a destination, the aircraft 201 determines which route-alive message to send based off by factoring in the route time corresponding to reach route-alive message. In such an example, the aircraft 201 can determine that the route time to tower 205 via aircraft 202 is 30 minutes based on the shorter of the route-time indicated in the route-alive message from the aircraft 202 (30 minutes) and the link time between the aircraft 201 and the aircraft 202 (30 minutes). The aircraft 201 can also determine that the route time to tower 205 via aircraft 203 is 10 minutes based on the shorter of the route-time indicated in the route-alive message from the aircraft 203 (10 minutes) and the link time between the aircraft 201 and the aircraft 203 (20 minutes). In such an example, the aircraft 201 will give higher priority for the route time factor to the route-alive message received from aircraft 202 and, correspondingly, to the route via aircraft 202. That is, the aircraft 201 will give higher priority for the route time factor to send a packet intended for tower 205 to aircraft 202 for forwarding towards tower 205. Since other factors in addition to route time can also be used to select a route-alive message, the aircraft 202 may not be the selected aircraft; however, it is given a higher priority with respect to the route time factor.

In an example, a route-alive message corresponding to a route time that is shorter than a threshold length is excluded from selection. In this way, a minimum potential route time can be maintained. Moreover, in an example, the forwarding limit discussed above can be a route time, such that if a first node 102 determines that a route time corresponding to the destination via a second node 102 is shorter than a threshold route time, the first node 102 will not generate and broadcast a child route-alive message based off the route-alive message from the second node 102. Such a forwarding limit based on route time is specific to the node 102 from which a route-alive message is received. That is, if a first node 102 a route time via a second node 102 is shorter than the threshold and a route time via a second node is longer than a threshold, the first node 102 will generate and broadcast a child route-alive message based off the route-alive message from the third node 102, but will not generate and broadcast a child route-alive message based off the route-alive message from the second node 102.

In addition to route time, other factors can also be used to select which of a plurality of route-alive messages in which to send packet based off. For example, the relative location of a node 102 corresponding to the route-alive message can be used (block 508-2). In particular, for a packet to be sent from a first node 102, a first route-alive message from a second node 102 that is physically closer to the destination identified in the first route-alive message than the first node 102 is given higher priority than a second route-alive message from a third node 102 that is physically farther from the destination identified in the second route-alive message than the first node 102. In this way, the first node 102 can reduce the possibility of looping the packet around between nodes and the packet is more likely to travel a more direct route to a destination. The location of the other nodes 102 can be determined in any suitable manner, such as based on an indication of their respective location (e.g., ADS-B signals) as discussed above. Referring back to FIG. 4, in such an example, if aircraft 202 received a route-alive message corresponding to the tower 205 from aircraft 201 and another route-alive message corresponding to the tower 205 from aircraft 203, aircraft 202 would give a higher priority to aircraft 203 than to aircraft 201 with respect to relative location. In an example, a node 102 that is farther away from its respective destination than a node 102 from which a packet is to be sent is excluded from possible selection, such that only nodes 102 that are the same distance or physically closer to their respective destination can be selected.

In some examples, the relative location of a node 102 can be used, in addition to the forwarding limit if it is used, to determine whether to generate a send a child route-alive message. For example, a first node 102 can determine that a child route-alive message will not be generated based off a route-alive message received from a second node 102, if the second node 102 is physically farther from the destination than the first node 102. Similar to factoring in location in the selection of a node 102, determining whether to generate a child route-alive message based on relative location of a node 102 can be used to reduce the possibility of loops in the network and to generally increase the directness of a route to the destination.

In an example, a factor that can also be used to select which of a plurality of route-alive message off of which to send a packet to includes an identifier for the node 102 that broadcast the respective route-alive message (block 508-3). There may be reasons why a node 102 would prefer one type of node 102 over another type of node 102. In an aircraft example, such as shown in FIG. 4, a given aircraft 201, 202, 203, 204 can give higher priority to route-alive messages from nodes 102 (aircraft 201, 202, 203, 204 or tower 205) that are associated with the same entity as the aircraft. This may be done because of a reduced cost when using nodes 102 that are associated with the same entity as a given aircraft 201, 202, 203, 204. In an implementation of such an example, an aircraft operated by Delta, can give higher priority to route-alive messages from other aircraft 201, 202, 203, 204 or tower(s) 205 that are also operated by Delta or are operated by a partner of Delta. In an implementation of such an example, each node 102 sends out an identifier such that the other nodes 102 can determine priority of the nodes 102 based on the identifier. Such an identifier can be included in the respective route-alive message broadcast by each node 102.

In some example, such an identifier can be used, in addition to the forwarding limit if it is used, to determine whether to generate and send a child route-alive message. For example, a first node 102 can determine that a child route-alive message will not be generated based off a route-alive message received from a second node 102, if the second node 102 is not associated with the same entity as the first node 102.

Other factors can also be used to select which of a plurality of route-alive message off of which to send a packet including, but not limited to a strength of a signal received from another node 102 and quality of service (QoS) of the route, which can include latency, data throughput, packet errors, packet loss on a completed route basis.

Once a route-alive message is selected, the packet is sent (e.g., with a unicast message) to the node 102 that broadcast the route-alive message. That node 102 receives the packet. In some examples, information is included with the packet that identifies the destination of the packet such that the node 102 that receives the packet selects the next hop node 102 by selecting the best route-alive message corresponding to that destination (i.e., excluding route-alive messages corresponding to other destinations). Such a node 102 receiving the packet can select a route-alive message based off of which to forward the packet, for example, again using the factors described herein with respect to FIG. 5. Each node 102 receiving the packet forwards the packet (e.g., using the method 500) until the packet arrives at the destination. In this way, the packet is routed through the ad-hoc network to the destination. The nodes 102 in an ad-hoc network can use such a method 500 to forward packets to and from a destination, such that nodes 102 that are outside of direct communication range from the destination can send and receive packets with the destination by routing the packets through other nodes 102 in the ad-hoc network.

Additionally, although the method 500 is described above with respect to a single packet, it should be understood that, in practice multiple packets will be sent using such a method 500. Such multiple packets can be sent all along the same route or along two or more different routes. Moreover, method 500 can be used in conjunction with other routing schemes such as sending redundant packets on the same route, sending redundant packets on different routes, and other routing schemes.

Also, other information can be included in a route-alive message such as information identifying connectivity of the destination (corresponding to the route-alive message) to other networks or entities (e.g., ground stations).

Advantageously, in an example, selecting a node 102 to which to send a packet as discussed above can treat packets that originate at a node 102 and packets that forwarded by the node 102 in the same manner. That is, if a first node 102 is selecting another node 102 to send a packet to when the packet originates at a first node 102, the first node 102 can use the method 300 described above. Additionally, if the first node 102 is selecting another node 102 to send a packet to when the packet was received from another node 102 and is being forwarded by the first node 102, the first node 102 can also use method 300 described. Accordingly, each node 102 in a network can use method 300 for packets that originate at and are forwarded by that node 102. This can enable a light weight routing scheme for each node 102 in the network.

Example Embodiments

Example 1 includes a method of routing packets at a first node in an ad-hoc network, the method comprising: receiving, at the first node, a plurality of route-alive messages corresponding to the same destination, each of the plurality of route-alive messages sent by a different node of a plurality of second nodes, each of the plurality of route-alive messages including a route time indicating a length of time in which a communicative connection is available between the node of the plurality of second nodes that sent the respective route-alive message and the destination; providing a packet to be routed to the destination; determining an updated route time for each of plurality of second nodes based on the route time indicated in each route-alive message, the updated route time corresponding to a length of time in which a communication connection is available between the first node and the destination through the respective second node; selecting a node of the plurality of second nodes based on the updated route time for each of the plurality of second nodes, wherein a node having a longer updated route time is given higher priority for selection; and sending the packet from the first node to the selected node.

Example 2 includes the method of Example 1, comprising: receiving an indication of a location of each of the plurality of second nodes; wherein selecting a node includes selecting a node based on the location of each of the plurality of second nodes, wherein a node having a location that is physically closer to the destination than the first node is given higher priority than a node having a location that is physically farther from the destination than the first node.

Example 3 includes the method of Example 2, wherein selecting a node includes excluding from selection each node of the plurality of second nodes having a location that is physically farther from the destination than the first node.

Example 4 includes the method of any of Examples 1-3, wherein determining an updated route time includes: determining a link time for each of the plurality of second nodes, wherein each link time is the length of time in which direct communication is available between the first node and the respective second node; and selecting, as the respective route time for each of the plurality of second nodes, the shorter of the route time indicated in the route-alive message from the respective second node or the link time between the first node and the respective second node.

Example 5 includes the method of Example 4, wherein determining a link time includes: receiving an indication of a location of each of the plurality of second nodes; receiving an indication of future movement of each of the plurality of second nodes; and calculating each of the link times, based on the location and future movement of the respective node of the plurality of second nodes and on the location and future movement of the first node.

Example 6 includes the method of Example 5, wherein the first node and each of the plurality of second nodes are aircraft that are flying; wherein receiving an indication of a location and an indication of future movement include receiving an automatic dependent surveillance broadcast (ADS-B) signal from each of the plurality of second nodes; wherein the location and future movement for the first node are obtained from a navigation system for the first node.

Example 7 includes the method of any of Examples 1-6, wherein the destination is one of a communication tower on the ground or another aircraft that is flying.

Example 8 includes the method of Example 7, wherein the communication tower is associated with a ground station for air traffic control.

Example 9 includes the method of any of Examples 1-8, comprising: receiving an identifier for each of the plurality of second nodes; wherein selecting a node includes selecting a node based on the identifier for each of the plurality of second nodes, wherein a node associated with the same entity as the first node is given a higher priority over a node not associated with the same entity.

Example 10 includes the method of any of Examples 1-9, wherein selecting a node includes excluding from selection each node of the plurality of second nodes having a route time that is shorter than a threshold.

Example 11 includes the method of any of Examples 1-10, wherein the communicative connection for a respective route time can correspond to a direct connection between a respective node and the destination or to a route through one or more intermediate nodes between the respective node and the destination.

Example 12 includes the method of any of Examples 1-11, wherein the first node and each of the plurality of second nodes is mobile.

Example 13 includes the method of any of Examples 1-12, wherein selecting a node includes selecting a node based on one or more of a signal strength and a number of hops in the route corresponding to each of the one or more second nodes.

Example 14 includes a method of broadcasting a route-alive message from a first node in an ad-hoc network, the method comprising: receiving, at the first node, a first route-alive message from a second node in the ad-hoc network, the first route-alive message including a first route time indicating a length of time in which a communicative connection is available between the second node and a destination; determining a second route time indicating a length of time in which a communicative connection is available between the first node and the destination through the second node; determining whether a forwarding limit for route-alive messages has been reached; and if the forwarding limit for route-alive messages has not been reached, broadcasting, from the first node, a second route-alive message, the second route-alive message including the second route time.

Example 15 includes the method of Example 14, wherein determining a second route time includes: determining a link time in which direct communication is available between the first node and the second node; and selecting as the second route time, the shorter of the first route time and the link time.

Example 16 includes the method of Example 15, wherein determining a link time includes: receiving an indication of a location of the second node; receiving an indication of future movement the second node; and calculating the link time based on the location and future movement of the second node and on the location and future movement of the first node.

Example 17 includes the method of Example 16, wherein the first node and the second node are aircraft that are flying; wherein receiving an indication of a location and an indication of future movement include receiving an automatic dependent surveillance broadcast (ADS-B) signal from the second node; wherein the location and future movement for the first node are obtained from a navigation system for the first node.

Example 18 includes the method of any of Examples 14-17, wherein determining whether a forwarding limit for route-alive messages has been reached includes: determining a physical distance between the first node and the destination; and if the physical distance is larger than a threshold, determining that the forwarding limit has been reached.

Example 19 includes the method of any of Examples 14-18, wherein determining whether a forwarding limit for route-alive messages has been reached includes: determining a number of hops between the first node and the destination; and if the number of hops is larger than a threshold, determining that the forwarding limit has been reached.

Example 20 includes a system for routing packets at a first node in an ad-hoc network, the system comprising: a wireless transceiver; one or more processing units coupled to the wireless transceiver; one or more data storage units coupled to the one or more processing units, the one or more data storage units including instructions which, when executed by the one or more processing units, cause the one or more processing units to: receive from the wireless transceiver a plurality of route-alive messages corresponding to the same destination, each of the plurality of route-alive messages sent by a different node of a plurality of second nodes, each of the plurality of route-alive messages including a route time indicating a length of time in which a communicative connection is available between the node of the plurality of second nodes that sent the respective route-alive message and the destination; providing a packet to be routed to the destination; determine an updated route time for each of plurality of second nodes based on the route time indicated in each route-alive message, the updated route time corresponding to a length of time in which a communication connection is available between the first node and the destination through the respective second node; select a node of the plurality of second nodes based on the updated route time for each of the plurality of second nodes, wherein a node having a longer updated route time is given higher priority for selection; and send the packet to the wireless transceiver, wherein the wireless transceiver transmits the first packet to the selected node

What is claimed is:

1. A method of routing packets at a first node in an ad-hoc network, the method comprising:
receiving, at the first node, a plurality of route-alive messages corresponding to a common destination, each of the plurality of route-alive messages sent by a different respective second node of a plurality of second nodes, each of the plurality of route-alive messages including a respective route time indicating a length of time during which a communicative connection is available between the respective second that sent the respective route-alive message and the destination;
providing a packet to be routed to the destination at the first node;
determining a respective updated route time for each respective second node based on the respective route time indicated in the respective route-alive message and a respective link time for the respective second node, wherein the respective link time for the respective second node is the length of time during which direct communication is available between the first node and the respective second node, wherein the respective updated route time corresponds to the shorter of the respective route time indicated in the respective route-alive message and the respective link time between the first node and the respective second node;
selecting a node of the plurality of second nodes based on the updated route time for each of the plurality of second nodes, wherein a node having a longer updated route time is given higher priority for selection than a node having a shorter updated route time; and
sending the packet from the first node to the selected node.

2. The method of claim 1, comprising:
receiving an indication of a location of each of the plurality of second nodes;
wherein selecting a node includes selecting a node based on the location of each of the plurality of second nodes, wherein a node having a location that is physically closer to the destination than the first node is given higher priority than a node having a location that is physically farther from the destination than the first node.

3. The method of claim 2, wherein selecting a node includes excluding from selection each node of the plurality of second nodes having a location that is physically farther from the destination than the first node.

4. The method of claim 1, wherein determining a respective link time includes:
receiving an indication of a location of respective second node;
receiving an indication of future movement of each respective second node; and
calculating each of the respective link times, based on the location and future movement of the respective second node and on the location and future movement of the first node.

5. The method of claim 4, wherein the first node and each of the plurality of second nodes are aircraft that are flying;
wherein receiving an indication of a location and an indication of future movement include receiving an automatic dependent surveillance broadcast (ADS-B) signal from each respective second node;

wherein the location and future movement for the first node are obtained from a navigation system for the first node.

6. The method of claim 1, wherein the destination is one of a communication tower on the ground or another aircraft that is flying.

7. The method of claim 6, wherein the communication tower is associated with a ground station for air traffic control.

8. The method of claim 1, comprising:
receiving an identifier for each of the plurality of second nodes;
wherein selecting a node includes selecting a node based on the identifier for each of the plurality of second nodes, wherein a node associated with a common entity as the first node is given a higher priority over a node not associated with the common entity.

9. The method of claim 1, wherein selecting a node includes excluding from selection each respective second node having a respective updated route time that is shorter than a threshold.

10. The method of claim 1, wherein the communicative connection for a respective route time can correspond to a direct connection between a respective node and the destination or to a route through one or more intermediate nodes between the respective node and the destination.

11. The method of claim 1, wherein the first node and each of the plurality of second nodes is mobile.

12. The method of claim 1, wherein selecting a node includes selecting a node based on one or more of a signal strength and a number of hops in the route corresponding to each of the one or more second nodes.

13. A system for routing packets at a first node in an ad-hoc
network, the system comprising:
a wireless transceiver;
one or more processing units coupled to the wireless transceiver;
one or more data storage units coupled to the one or more processing units, the one or more data storage units including instructions which, when executed by the one or more processing units, cause the one or more processing units to:
receive from the wireless transceiver a plurality of route-alive messages corresponding to a common destination, each of the plurality of route-alive messages sent by a different respective second node of a plurality of second nodes to the first node, each of the plurality of route-alive messages including a respective route time indicating a length of time during which a communicative connection is available between the respective second node that sent the respective route-alive message and the destination;
providing a packet to be routed to the destination at the first node;
determine a respective updated route time for each respective second node based on the respective route time indicated in the respective route-alive message and a respective link time for the respective second node, wherein the respective link time for the respective second node is the length of time during which direct communication is available between the first node and the respective second node, wherein the respective updated route time corresponding corresponds to the shorter of the respective route time indicated in the respective route-alive message and the respective link time between the first node and the respective second node;
select a node of the plurality of second nodes based on the updated route time for each of the plurality of second nodes, wherein a node having a longer updated route time is given higher priority for selection than a node having a shorter updated route time; and
send the packet to the wireless transceiver, wherein the wireless transceiver transmits the first packet to the selected node.

* * * * *